United States Patent
Gresset et al.

(10) Patent No.: US 8,452,320 B2
(45) Date of Patent: May 28, 2013

(54) METHOD AND A DEVICE FOR CONTROLLING SIGNALS TRANSFERRED BY A WIRELESS TELECOMMUNICATION DEVICE

(75) Inventors: Nicolas Gresset, Rennes Cedex (FR); Herve Bonneville, Rennes Cedex (FR); Loic Brunel, Rennes Cedex (FR); Mourad Khanfouci, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 228 days.

(21) Appl. No.: 12/947,340

(22) Filed: Nov. 16, 2010

(65) Prior Publication Data

US 2011/0124365 A1 May 26, 2011

(30) Foreign Application Priority Data

Nov. 18, 2009 (EP) ..................... 09176350

(51) Int. Cl.
*H04B 7/00* (2006.01)

(52) U.S. Cl.
USPC ............ 455/522; 455/69; 455/70; 455/436; 455/437; 455/438; 370/315; 370/316; 370/317; 370/318; 370/319

(58) Field of Classification Search
USPC ............ 455/436–449, 432.1, 522, 69–70; 370/315–320
See application file for complete search history.

(56) References Cited

U.S. PATENT DOCUMENTS

| 6,415,163 B1 * | 7/2002 | Keskitalo et al. .......... 455/562.1 |
| 8,125,917 B2 * | 2/2012 | Bevan et al. .................. 370/252 |
| 2010/0091745 A1 * | 4/2010 | Bevan et al. .................. 370/338 |

FOREIGN PATENT DOCUMENTS

GB  2 446 192 A  8/2008

OTHER PUBLICATIONS

Extended European Search Report issued May 3, 2010, in Europe 09176350.8-1249, filed Nov. 18, 2009.

* cited by examiner

*Primary Examiner* — Fayyaz Alam
(74) *Attorney, Agent, or Firm* — Oblon, Spivak, McClelland, Maier & Neustadt, L.L.P.

(57) ABSTRACT

The present invention concerns a method for controlling signals transferred by a wireless telecommunication device. A first and at least one second physical cell identifiers are allocated to the wireless telecommunication device, the first physical cell identifier being intended to identify the cell of the wireless telecommunication device and to characterize a code for scrambling data, the at least one second physical cell identifier being not intended to characterize a code. The method comprises the steps of:
  determining a power pattern for transferring the first physical cell identifier,
  determining another power pattern for transferring the at least one second physical cell identifier which is strictly lower than the first power pattern,
  transferring the physical cell identifiers and the power patterns to the wireless telecommunication device and/or transferring in parallel signals representative of the physical cell identifiers according to the power patterns to mobile terminals.

9 Claims, 4 Drawing Sheets

METHOD AND A DEVICE FOR CONTROLLING SIGNALS TRANSFERRED BY A WIRELESS TELECOMMUNICATION DEVICE

FIELD OF THE INVENTION

The present invention relates generally to a method and a device for controlling signals transferred by a wireless telecommunication device of a wireless cellular telecommunication network to mobile terminals.

BACKGROUND OF THE INVENTION

In classic wireless cellular telecommunication networks, each base station has an identifier like a physical cell identifier (PCID) for each of its cells or each sector of its cell or cells. The PCID characterises a cell or sector of the base station in the physical layer.

For example, the PCID is associated to two sequences, a first sequence named PSC sequence or Primary Synchronisation Signal (PSS) is transferred in the Primary Synchronisation Channel (PSC) and a second sequence named SSC sequence or Secondary Synchronisation Signal (SSS) is transferred in the Secondary Synchronisation Channel (SSC).

Three PSC sequences are available in the wireless cellular telecommunication network, each having good time auto-correlation properties.

In addition to PCID identification, the PSC sequences may be used for rough synchronisation and for channel estimation enabling coherent detection of the SSC sequence. In addition to PCID identification, the SSC sequences may be used for synchronisation refinement.

The three PSC sequences are quasi-orthogonal in order to ensure efficient time synchronisation for three different synchronised cells.

Hundred sixty eight SSC sequences are available in the wireless cellular telecommunication network, each having low cross-correlation with other SSC sequences.

According to the aforementioned example, the total number of PCIDs is then equal to five hundred and four.

The PCID is usually used to identify a cell and to characterise a code for scrambling data exchanged with mobile terminals.

By monitoring the received PCID signals strength from neighbouring base stations at a mobile terminal, the system can decide to hand-over the mobile terminal communication to the best signal strength base station.

Schematically, a mobile terminal reports measures and corresponding PCID to its serving base station. The base station decides that it's profitable to proceed to a hand-over of the mobile terminal to a target base station identified by a selected PCID. The base station transfers a hand-over request to the target base station. If the hand-over is accepted, resources are allocated at the target base station and the base station asks the mobile terminal to hand-over to the target base station. The mobile terminal attempts to connect to the target base station and the resource is freed at the source base station in case of success. A path switch is made to redirect data intended to the mobile terminal to the target base station.

Today, wireless cellular telecommunication networks are largely deployed but there are still some areas not covered by the base stations of the wireless cellular telecommunication network.

The access to the wireless cellular telecommunication network might not be possible for a mobile terminal located in a building, if the signals radiated by the base stations are too attenuated.

Particular wireless telecommunication devices, like home base stations or femto base stations or pico base stations, provide coverage areas at least within the buildings. Relays are also considered.

In a wireless cellular telecommunication network comprising a large number of home base stations, a base station may face a situation wherein under its coverage area, several home base stations transmit the same PCID. The neighbouring relation table is not anymore a one to one mapping between the PCID and the cell of the target base station or home base station. This situation is called PCID confusion as the source base station cannot uniquely identify, from a PCID, the cell of the target base station or home base station in a hand-over procedure.

In a network comprising a large number of home base stations, interference management is a critical issue. When the amount of home base stations becomes very important, situation may occur wherein classic Inter Cell Interference Coordination (ICIC) techniques cannot be used. The possibility to manage base stations interferences by groups may be necessary.

SUMMARY OF THE INVENTION

The present invention aims at providing a solution which enables a device like a home base station or a relay to use a PCID for purposes different than the characterisation of a code for scrambling data exchanged with mobile terminals and which avoids that hand-over procedures are started to cells transmitting PCIDs which are used for another purpose than the characterisation of a code for scrambling data exchanged with mobile terminals.

To that end, the present invention concerns a method for controlling signals transferred by a wireless telecommunication device of a wireless cellular telecommunication network to mobile terminals, characterised in that a first and at least one second physical cell identifiers are allocated to the wireless telecommunication device, the first physical cell identifier being intended to identify the cell of the wireless telecommunication device among neighbouring cells of other wireless telecommunication devices and to characterise a code for scrambling data exchanged between the wireless telecommunication device and mobile terminals, the at least one second physical cell identifier being not intended to characterise a code for scrambling data exchanged with mobile terminals, and the method comprises the steps of:

determining a power pattern to be applied by the wireless telecommunication device for transferring signals representative of the first physical cell identifier to mobile terminals, determining another power pattern to be applied by the wireless telecommunication device for transferring signals representative of the at least one second physical cell identifier to mobile terminals, the other power pattern being strictly lower than the first power pattern, transferring the first and the at least one second physical cell identifiers and the power patterns to the wireless telecommunication device and/or transferring in parallel signals representative of the first and the at least one second physical cell identifiers according to the power patterns to mobile terminals.

The present invention concerns also a device for controlling signals transferred by a wireless telecommunication device of a wireless cellular telecommunication network to mobile terminals, characterised in that a first and at least one second physical cell identifiers are allocated to the wireless telecommunication device, the first physical cell identifier being intended to identify the cell of the wireless telecommunication device among neighbouring cells of other wireless telecommunication devices and to characterise a code for scrambling data exchanged between the wireless telecommunication device and mobile terminals, the at least one second physical cell identifier being not intended to characterise a code for scrambling data exchanged with mobile terminals, and the device for controlling signals comprises:

means for determining a power pattern to be applied by the wireless telecommunication device for transferring signals representative of the first physical cell identifier to mobile terminals, means for determining another power pattern to be applied by the wireless telecommunication device for transferring signals representative of the at least one second physical cell identifier to mobile terminals, the other power pattern being strictly lower than the first power pattern, means for transferring the first and the at least one second physical cell identifiers and the power patterns to the wireless telecommunication device and/or transferring in parallel signals representative of the first and the at least one second physical cell identifiers according to the power patterns to mobile terminals.

Thus, hand-over procedures are not started with cells transmitting PCIDs which are used for another purpose than the characterisation of a code for scrambling data exchanged with mobile terminals.

As the power pattern used for transferring signals representative of the at least one second physical cell identifier is smaller than the power pattern used for transferring signals representative of the first physical cell identifier, the probability is low that the signals representative of one second physical cell identifier are received at a higher level by a mobile terminal than the signals representative of the first physical cell identifier.

According to a particular feature, the present invention is executed by a base station or an access gateway of the wireless cellular telecommunication network and one second physical cell identifier is intended to identify each wireless telecommunication device of a group of wireless telecommunication devices, at least two wireless telecommunication devices being neighbours.

Thus, the second physical cell identifier may be used for the purpose of inter-cell interference coordination technique in a wireless cellular telecommunication network in which wireless telecommunication devices like home base stations and/or relays are deployed.

For example, one second physical cell identifier is allocated to each wireless telecommunication device of the group of wireless telecommunication devices and the same set of parameters for controlling the interferences generated by radio signals transferred to or by each wireless telecommunication device of the group of wireless telecommunication devices is allocated to each wireless telecommunication device of the group of wireless telecommunication devices.

According to a particular feature, the power pattern to be applied by the wireless telecommunication device for transferring signals representative of the second physical cell identifier to mobile terminals is lower than the power pattern to be applied by the wireless telecommunication device for transferring signals representative of the first physical cell identifier to mobile terminals divided by the number of telecommunication devices included in the group of telecommunication devices located in the neighbourhood of the wireless communication device.

Thus, even if the signals representative of the second physical cell identifier transferred by plural wireless telecommunication devices are superposed at the mobile terminal side, the overall received power of the signals representative of the second physical cell identifier will be lower than the signals representative of the first physical cell identifiers transferred by the wireless telecommunication devices.

According to a particular feature, the method is executed by a base station or an access gateway of the wireless cellular telecommunication network or the wireless telecommunication device and the at least one second physical cell identifier is or are intended to increase the probability of unique identification of the cell of the wireless telecommunication device which transfers the first physical cell identifier.

Thus, the hand-over procedure efficiency is increased.

According to a particular feature, the wireless telecommunication device is a home base station or a relay.

Thus, PCID confusions that happen in dense deployments of wireless telecommunication devices can be solved.

According to a particular feature, a second physical cell identifier is added to signals transmitted in a cell by a wireless communication device if it is detected that the cell can't be differentiated in a neighbourhood from at least one cell of a wireless telecommunication device from their physical cell identifiers.

Thus, the number of second physical cell identifiers transmitted by a wireless communication device is limited to the minimum number that prevents PCID confusion.

According to a particular feature, the power patterns of at least two second physical cell identifiers are set with decreasing values, the sum of transmitted powers of second physical cell identifiers being lower than the transmitted power of the first physical cell identifier.

Thus, even if the signals representative of the second physical cell identifiers transferred by a wireless telecommunication device are superposed at the mobile terminal side, the overall received power of the signals representative of the second physical cell identifiers will be lower than the signals representative of the first physical cell identifier transferred by the wireless telecommunication device.

The PCID confusion may be solved with a hierarchical detection of second physical cell identifiers based on their transmitted power pattern.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the method and apparatus according to the invention, they will not be repeated here.

BRIEF DESCRIPTION OF THE DRAWINGS

The characteristics of the invention will emerge more clearly from a reading of the following description of an example of embodiment, the said description being produced with reference to the accompanying drawings, among which.

DETAILED DESCRIPTION OF THE INVENTION

Figure 1:
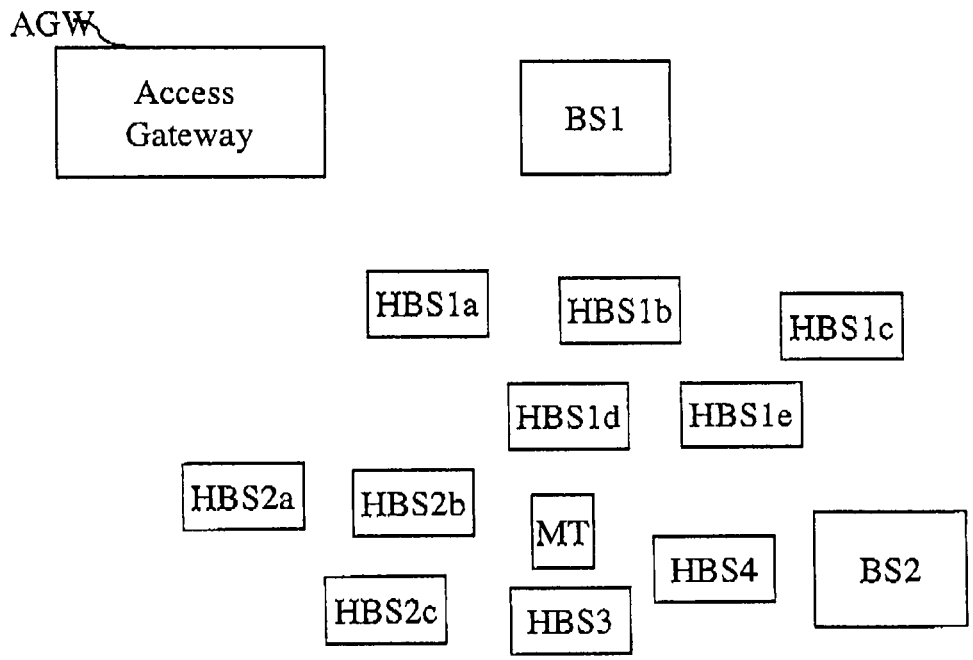
FIG. 1 represents a wireless cellular telecommunication network in which the present invention is implemented.

FIG. 1 represents a wireless cellular telecommunication network in which the present invention is implemented.

In FIG. 1, one mobile terminal MT, two base stations BS1 and BS2 and ten wireless telecommunication devices HBS1a, HBS1b, HBS1c, HBS1d, HBS1e, HBS2a, HBS2b, HBS2c, HBS3 and HBS4 of a wireless cellular telecommunication network are shown.

Two base stations BS1 and BS2 and ten wireless telecommunication devices HBS1a, HBS1b, HBS1c, HBS1d, HBS1e, HBS2a, HBS2b, HBS2c, HBS3 and HBS4 are shown but we can understand that the present invention works when a different, e.g., more important, number of base stations and/or wireless telecommunication devices exist in the wireless cellular telecommunication network.

For the sake of simplicity, the present invention will be described in an example where each base station BS or each wireless telecommunication device HBS manages a single cell. The present invention is also applicable when at least one and/or at least one wireless telecommunication device manages more than one cell.

Only one mobile terminal MT is shown but we can understand that the present invention works with a different, e.g., more important, number of mobile terminals.

The wireless telecommunication devices HBS are for example located at home.

The wireless telecommunication devices HBS may be for example home base stations or relays or a combination of relays and home base stations.

Each home base station HBS may enable mobile terminals associated to the home base station HBS to access the wireless cellular telecommunication network.

Each relay may enable mobile terminals associated to the relay to access the wireless cellular telecommunication network. For example, relays transmit signals through a downlink channel to mobile terminals and receive signals from mobile terminals through an uplink channel as if they were classic base stations or home base stations. However, unlike a base station or a home base station which has a wired connection to a telecommunication network, the relay only has a wireless connection with a base station or a home base station and its connection to the telecommunication network is done via the base station or the home base station.

The wireless telecommunication devices HBS are able to receive signals transferred by mobile terminals which are located in the cell, not shown in FIG. 1, they respectively manage. The wireless telecommunication devices HBS transfer signals which can be received and processed by mobile terminals located in the cell they respectively manage.

An access gateway AGW may be included in the wireless cellular telecommunication network. The access gateway AGW may determine with which wireless telecommunication device HBS a hand-over has to be performed.

The access gateway AGW may interface the wireless telecommunication devices HBS with the remaining devices of the wireless cellular telecommunication network.

In the present invention, plural wireless telecommunication devices HBS, forming a group of wireless telecommunication devices may share the same common identifier.

A group of wireless telecommunication devices may or may not be geographically localized. The groups of wireless telecommunication devices may be distributed in space.

According to the present invention, wireless telecommunication devices HBS may transfer plural PCIDs.

For example, one of the PCID is used to characterise a code for scrambling data exchanged with mobile terminals and intends to identify the wireless telecommunication device among neighbouring wireless telecommunication devices or base stations. The other PCID(s) is or are transferred in order to bring diversity and refine wireless telecommunication device identification or is or are transferred in order to identify a group of wireless telecommunication devices. That or these other PCID(s) can not be used for exchanging data and consequently can't be used by mobile terminals for cell selection or re-selection or by base stations for hand-over even if such PCID becomes a good candidate in measurement reports.

If one other PCID becomes a good candidate, a result is that the mobile terminal will not get access to the wireless cellular telecommunication network through the cell it has selected.

As another result, the hand-over in which a mobile terminal is involved will fail and the access to the wireless cellular telecommunication network may be interrupted for the mobile terminal.

For example, each wireless telecommunication devices HBS1a, HBS1b, HBS1c, HBS1d and HBS1e transfer two PCIDs to mobile terminal MT. A first PCID is used for characterising the code for scrambling data exchanged with the mobile terminal MT and for identifying the cells of the wireless telecommunication devices HBS1a, HBS1b, HBS1c, HBS1d and HBS1e among cells of base stations BS1 and BS2 and of the wireless telecommunication devices HBS1a, HBS1b, HBS1c, HBS1d, HBS1e, HBS2a, HBS2b, HBS2c, HBS3 and HBS4. At least one second PCID is common to all the wireless telecommunication devices HBS1a, HBS1b, HBS1c, HBS1d and HBS1e which form a group of wireless telecommunication devices, For example, each wireless telecommunication devices HBS2a, HBS2b and HBS2c transfer two PCIDs to mobile terminal MT. A first PCID is used for the purposes of characterising the code for scrambling data exchanged with the mobile terminal MT and for a rough identification of the cells of the wireless telecommunication devices HBS2a, HBS2b and HBS2c among base stations BS1 and BS2 and the wireless telecommunication devices HBS1a, HBS1b, HBS1c, HBS1d, HBS1e, HBS2a, HBS2b, HBS2c, HBS3 and HBS4. At least one second PCID is used for the purpose of enhancing wireless communication devices cells identification.

Each wireless telecommunication device HBS3 and HBS4, each base station BS1 and BS2 transfers respectively a single PCID which identifies the cell of the wireless telecommunication device or base station among base stations BS1 and BS2 and the wireless telecommunication devices HBS1a, HBS1b, HBS1c, HBS1d, HBS1e, HBS2a, HBS2b, HBS2c, HBS3 and HBS4 and which is used for characterising the code for scrambling data exchanged with the mobile terminal MT.

For example, wireless telecommunication devices HBS4 and HBS2a are not direct neighbours from radio point of view, but are both neighbours to base station BS2. The wireless telecommunication devices HBS4 and HBS2a share the same PCID.

The base stations BS1 and BS2 and the access gateway AGW are linked together by a communication network not shown in FIG. 1.

The wireless telecommunication devices HBS1a, HBS1b, HBS1c, HBS1d, HBS1e, HBS2a, HBS2b, HBS2c, HBS3 and HBS4, may be linked by the communication network if the wireless telecommunication devices are home base stations.

The communication network is, for example, a PSTN network (Public Switch Telecommunication Network) or a packet switched network like an ISDN (Integrated Services Digital Network) network, etc.

As the mobile terminal MT is close to the base stations BS and the wireless telecommunication devices HBS, the mobile terminal MT receives each PCID transferred by base stations BS and wireless telecommunication devices HBS.

According to the invention, each base station BS or the access gateway AGW or each wireless telecommunication device:
  determines a power pattern to be applied by the wireless telecommunication device for transferring signals representative of the first physical cell identifier to mobile terminals,
  determines another power pattern to be applied by the wireless telecommunication device for transferring signals representative of the at least one second physical cell identifier to mobile terminals, the other power pattern being strictly lower than the first power pattern,
  transfers the first and the at least one second physical cell identifiers and the power patterns to the wireless telecommunication device and/or transfers in parallel signals representative of the first and the at least one second physical cell identifiers according to the power patterns to mobile terminals.

Figure 2:
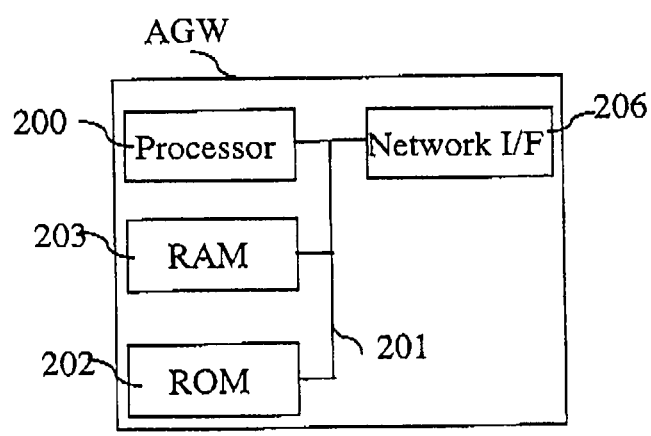
FIG. 2 is a diagram representing the architecture of an access gateway in which the present invention is implemented.

FIG. 2 is a diagram representing the architecture of an access gateway in which the present invention is implemented.

Figure 5:
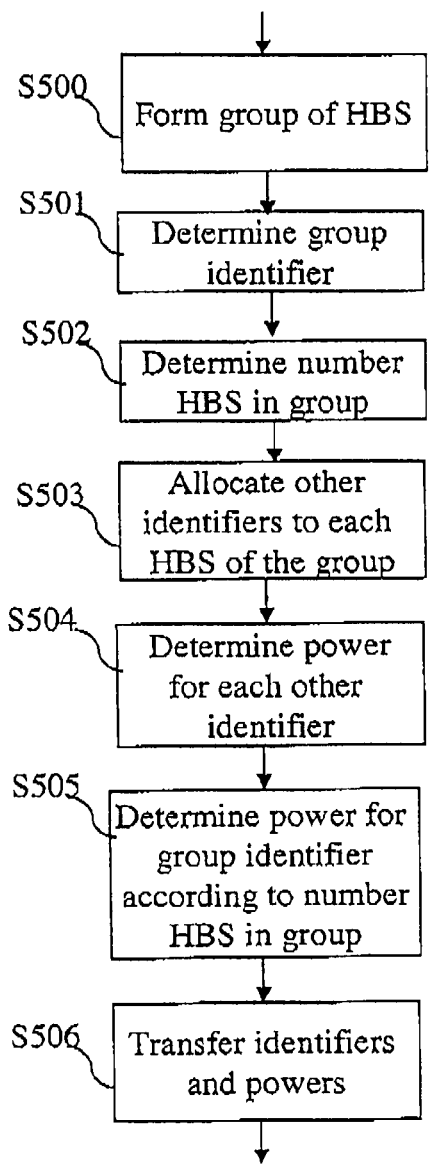
FIG. 5 discloses an example of an algorithm executed by an access gateway or a base station according to a first mode of realisation of the present invention.
Figure 6:
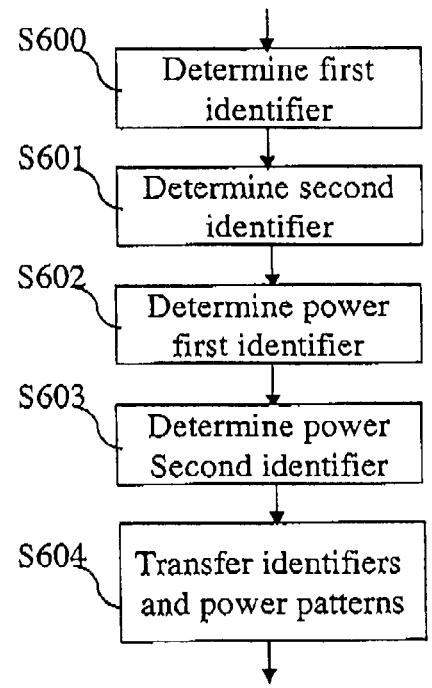
FIG. 6 discloses an example of an algorithm executed by an access gateway or a base station or a wireless telecommunication device according to a second mode of realisation of the present invention.
Figure 7:
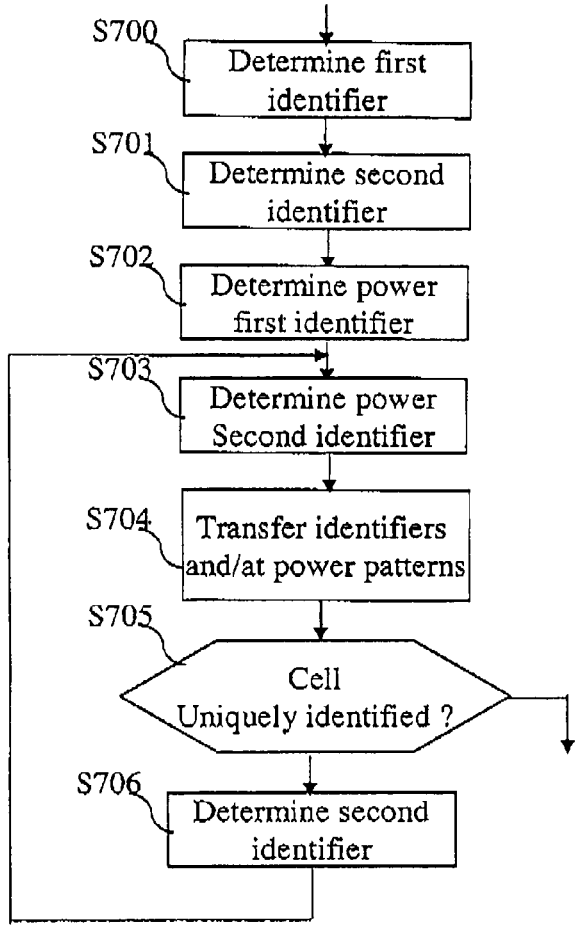
FIG. 7 discloses an example of an algorithm executed by an access gateway or a base station or a wireless telecommunication device according to a third mode of realisation of the present invention.

The access gateway AGW has, for example, an architecture based on components connected together by a bus 201 and a processor 200 controlled by the program as disclosed in FIG. 5 or 6 or 7.

It has to be noted here that, instead of being based on a processor, the architecture of the access gateway AGW may be based on dedicated integrated circuits.

The bus 201 links the processor 200 to a read only memory ROM 202, a random access memory RAM 203 and a network interface 206.

The memory 203 contains registers intended to receive variables and the instructions of the program related to the algorithm as disclosed in FIG. 5 or 6 or 7.

The processor 200 controls the operation of the network interface 206.

The read only memory 202 contains instructions of the program related to the algorithm as disclosed in FIG. 5 or 6 or 7, which are transferred, when the access gateway AGW is powered on, to the random access memory RAM 203.

The access gateway AGW is connected to a telecommunication network through the network interface 206. For example, the network interface 206 is a DSL (Digital Subscriber Line) modem, or an ISDN (Integrated Services Digital Network) interface, etc.

Through the network interface 206, the access gateway AGW may transfer messages to wireless telecommunication devices HBS or to base stations BS of the wireless cellular telecommunication network or to core devices of the wireless cellular telecommunication network not shown in FIG. 1.

Figure 3:
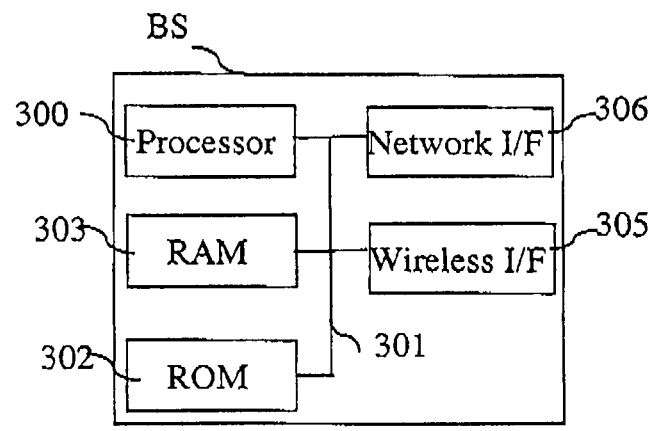
FIG. 3 is a diagram representing the architecture of a base station in which the present invention is implemented.

FIG. 3 is a diagram representing the architecture of a base station in which the present invention is implemented.

The base station BS has, for example, an architecture based on components connected together by a bus 301 and a processor 300 controlled by the program as disclosed in FIG. 5 or 6 or 7.

It has to be noted here that, instead of being based on a processor, the architecture of the base station BS may be based on dedicated integrated circuits.

The bus 301 links the processor 300 to a read only memory ROM 302, a random access memory RAM 303 and a network interface 306.

The memory 303 contains registers intended to receive variables and the instructions of the program related to the algorithm as disclosed in FIG. 5 or 6 or 7.

The processor 300 controls the operation of the network interface 306.

The read only memory 302 contains instructions of the program related to the algorithm as disclosed in FIG. 5 or 6 or 7, which are transferred, when the base station BS is powered on, to the random access memory RAM 303.

The base station BS is connected to a telecommunication network through the network interface 306. For example, the network interface 306 is a DSL modem, or an ISDN interface, etc.

Through the network interface 306, the base station BS may transfer messages to wireless telecommunication devices HBS or to the access gateway of the wireless cellular telecommunication network or to core devices of the wireless cellular telecommunication network not shown in FIG. 1.

The wireless interface 305 comprises a downlink transmission module and an uplink reception module.

Figure 4:
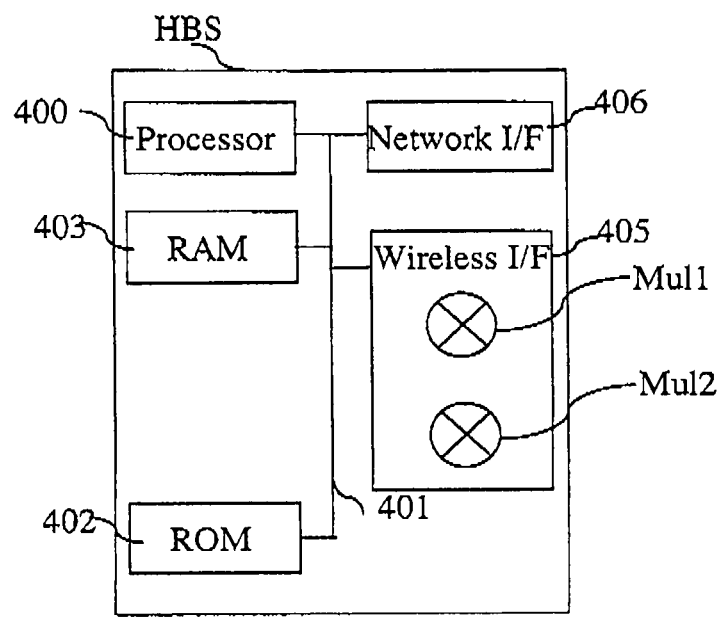
FIG. 4 is a diagram representing the architecture of a wireless telecommunication device in which the present invention is implemented.

FIG. 4 is a diagram representing the architecture of a wireless telecommunication device in which the present invention is implemented.

Figure 8:
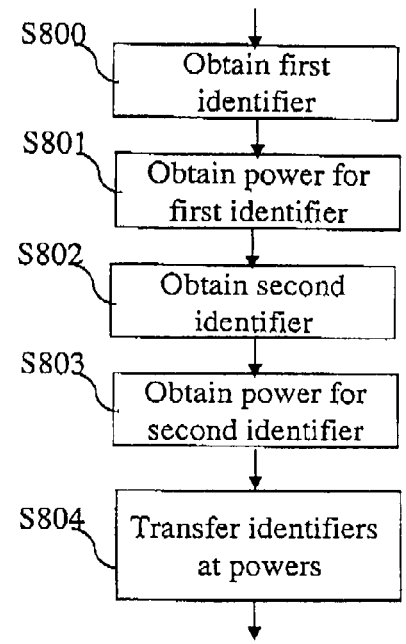
FIG. 8 discloses an example of an algorithm executed by a wireless telecommunication device according to the present invention.

The wireless telecommunication device HBS has, for example, an architecture based on components connected together by a bus 401 and a processor 400 controlled by the program as disclosed in FIG. 8.

It has to be noted here that, instead of being based on a processor, the architecture of the wireless telecommunication device HBS may be based on dedicated integrated circuits.

The bus 401 links the processor 400 to a read only memory ROM 402, a random access memory RAM 403, a wireless interface 405 and a network interface 406.

The memory 403 contains registers intended to receive variables and the instructions of the program related to the algorithm as disclosed in FIG. 8.

The processor 400 controls the operation of the network interface 406 and of the wireless interface 405.

The read only memory 402 contains instructions of the program related to the algorithm as disclosed in FIG. 8, which are transferred, when the wireless telecommunication device HBS is powered on, to the random access memory 403.

If the wireless telecommunication device HBS is a home base station, the wireless telecommunication device HBS may be connected to a telecommunication network through the network interface 406. For example, the network interface 406 is a DSL (Digital Subscriber Line) modem, or an ISDN (Integrated Services Digital Network) interface, etc.

Through the network interface 406, the home base station HBS may transfer messages to other base stations BS or to home base stations HBS or to the coordinator 10.

If the wireless telecommunication device HBS is a home base station, the wireless interface 405 comprises a downlink transmission module and an uplink reception module.

If the wireless telecommunication device HBS is a relay, the wireless interface 405 comprises a downlink reception module and an uplink transmission module for the transfer of signals between the relay and a base station BS. The wireless interface 405 further comprises a downlink transmission module and an uplink reception module for the transfer of signals between the relay and mobile terminals.

The wireless interface 405 further comprises at least two multiplication modules Mul1 and Mul2 for multiplying the signals representative of at least two PCIDs in order to have different transmit powers for the at least two PCIDs transferred to the mobile terminals.

The wireless interface 405 and the network interface 406 are the resources of the home base station HBS that may be used by a mobile terminal in order to access the wireless cellular telecommunication network when the mobile terminal establishes or receives a communication with a remote telecommunication device.

FIG. 5 discloses an example of an algorithm executed by an access gateway or a base station according to a first mode of realisation of the present invention.

The present algorithm will be disclosed when it is executed by the processor 200 of the access gateway AGW.

At step S500, the processor 200 forms a group of wireless telecommunication devices HBS. The group of wireless telecommunication devices may be formed using the location information of the wireless telecommunication devices HBS.

For example, the group of wireless telecommunication devices comprises the wireless telecommunication devices HBS1a to HBS1e.

At next step S501, the processor 200 determines one common physical cell identity, named group identifier, to be commonly transferred by the wireless telecommunication devices of the group of wireless telecommunication devices.

According to a particular feature of the present invention, a physical cell identity corresponds to one set of ICIC parameters.

Among the five hundred and four physical cell identities, some of them, for example twenty of them are reserved for groups of home base stations and each of them corresponds to a set of inter-cell interference coordination (ICIC) parameters for uplink channel or a set of ICIC parameters for downlink channel.

For example, the processor 200 determines the group identifier by receiving, through the network interface 206, information related to interferences measured by the mobile terminals and/or by the base station BS1 or BS2 and/or by wireless telecommunication devices HBS.

Information related to interferences are for example the power strength of signals transferred by or to neighbour base stations or by or to at least one group of wireless telecommunication devices, each identified by a physical cell identity, and received by mobile terminals and/or base stations BS and/or wireless telecommunication devices HBS.

Each mobile terminal transfers a message comprising information related to interferences to the base station which is currently serving it.

The message is used as such by the serving base station BS when it executes the present algorithm or is transferred by the serving base station BS to the access gateway AGW or is processed by the serving base station BS and the result of the process is transferred to the access gateway AGW.

The processor 200 determines a set of ICIC parameters for the group of wireless telecommunication devices. For example, ICIC procedure reserves a part of the resource to cell-edge mobile terminals.

To this end, a power pattern is defined for each base station BS or group of wireless telecommunication devices HBS, where the maximum transmit power to be used by each mobile terminal for uplink transmission with the base station BS or with a wireless telecommunication device HBS of group of wireless telecommunication devices HBS and/or by the base station or by the wireless telecommunication devices HBS of the group of wireless telecommunication devices for downlink transmission in a given frequency resource varies.

This pattern changes from one base station BS or one group of wireless telecommunication devices HBS to another. For example, two neighbouring base stations BS and/or groups of wireless telecommunication devices HBS have different patterns.

The ICIC parameters are then optimized depending on the level of interference mobile terminals suffer from or create.

In a variant, the processor 200 determines a set of ICIC parameters for each wireless telecommunication device HBS the processor 200 is aware of the existence or for each wireless telecommunication device HBS comprised in a group of wireless telecommunication devices and may modify the group of wireless telecommunication devices according to the determined sets of ICIC parameters.

From the determined set of ICIC parameters, the processor 200 determines the group identifier.

At next step S502, the processor 200 determines the number of wireless telecommunication devices HBS which are included in the group of wireless telecommunication devices formed at step S500.

According to the above mentioned example, five wireless telecommunication devices HBS belong to the group of wireless telecommunication devices.

At next step S503, the processor 200 determines one other physical cell identity for each wireless telecommunication device HBS of the group of wireless telecommunication devices. In a variant, the other physical cell identity is determined by a core network device of the wireless cellular telecommunication network or by each wireless telecommunication device HBS.

Each other physical cell identity allocated to a wireless cellular telecommunication device HBS is not shared with each wireless telecommunication device HBS of the group of wireless telecommunication devices.

The other physical cell identifier is intended to identify the cell of the wireless telecommunication device among neighbouring cells of other wireless telecommunication devices and to characterise a code for scrambling data exchanged between the wireless telecommunication device and mobile terminals.

At next step S504, the processor 200 determines a power pattern for each other physical cell identity determined at step S504. Each power pattern is intended to be applied by the corresponding wireless telecommunication device HBS for transferring the other physical cell identity to mobile terminals.

For example, the power pattern is determined as the ICIC parameters determined at step S501 or is equal to a predetermined value.

A next step S505, the processor 200 determines the power pattern to be applied by each wireless telecommunication device HBS of the group of wireless telecommunication devices for transferring the group identifier to mobile terminals.

The power pattern is determined according to the number or the density of wireless telecommunication devices of the group of wireless telecommunication devices located in the neighbourhood of the wireless communication device HBS.

For example, the power pattern for transferring the group identifier to mobile terminals is lower than or equal to the other power pattern transferred by the wireless telecommunication device HBS divided by the number of wireless telecommunication devices which are included in the group of wireless telecommunication devices formed at step S500 and which are located in the neighbourhood of the wireless telecommunication device HBS.

At next step S506, the processor 200 commands the transfer of a message comprising the group identifier and the other physical cell identity together with the power patterns to each wireless telecommunication device HBS of the group of wireless telecommunication devices.

After that, the processor 200 returns to step S500 in order to process another group of wireless telecommunication devices if needed.

FIG. 6 discloses an example of an algorithm executed by an access gateway or a base station or a wireless telecommunication device according to a second mode of realisation of the present invention.

The present algorithm will be disclosed when it is executed by the processor 200 of the access gateway AGW.

At next step S600, the processor 200 determines a first physical cell identity for at least one wireless telecommunication device HBS which is located in the area the access gateway AGW is in charge of. In a variant, the first physical cell identity is determined by a core network device of the wireless cellular telecommunication network or by each wireless telecommunication device HBS.

The first physical cell identity allocated to a wireless telecommunication device HBS is not shared with each wireless telecommunication device located in the direct neighbourhood of the wireless telecommunication device, however it can be shared by wireless communication devices that are neighbours of a neighbouring wireless communication device or base station.

For example the first physical cell identity that is allocated to wireless communication device HBS2a is shared with wireless communication device HBS4, both being neighbours of base station BS2.

The first physical cell identifier is intended to identify the cell of the wireless telecommunication device among neighbouring cells of other wireless telecommunication devices and to characterise a code for scrambling data exchanged between the wireless telecommunication device and mobile terminals.

At next step S601, the processor 200 determines at least one second physical cell identity for at least one wireless telecommunication device HBS which is located in the area the access gateway AGW is in charge of. In a variant, the or each second physical cell identity is determined by a core network device of the wireless cellular telecommunication network or by each wireless telecommunication device HBS.

The or each second physical identity is allocated to a wireless telecommunication device for the purpose of providing additional information for identifying a wireless telecommunication device. For example, HBS2a and HBS4 share the same first physical cell identifier, but HBS2a has a second physical cell identifier and HBS4 has no second physical cell identifier. Thanks to the second physical cell identifier, the base station BS2 is then able to discriminate between cells of HBS2a and HBS4 from measurement reports provided by mobile terminal MT.

At next step S602, the processor 200 determines a power pattern for the first physical cell identity determined at step S600. The power pattern is intended to be applied by the corresponding wireless telecommunication device HBS for transferring the first physical cell identity to mobile terminals.

For example, the power pattern is determined as the ICIC parameters determined at step S501 of FIG. 5 or is equal to a predetermined value.

At next step S603, the processor 200 determines a power pattern for each second physical cell identity determined at step S601. Each power pattern is intended to be applied by the corresponding wireless telecommunication device HBS for transferring the second physical cell identity to mobile terminals.

According to the invention, the power pattern for transferring the or each second physical cell identity to mobile terminals is strictly lower than the power pattern for transferring the first physical cell identity to mobile terminals by the wireless telecommunication device.

At next step S604, the processor 200 commands the transfer of a message comprising the first physical cell identity and the at least one second physical cell identity together with the power patterns to each of the at least one wireless telecommunication device.

After that, the processor 200 interrupts the present algorithm.

FIG. 7 discloses an example of an algorithm executed by an access gateway or a base station or a wireless telecommunication device according to a third mode of realisation of the present invention.

The present algorithm will be disclosed when it is executed by the processor 200 of the access gateway AGW.

At next step S700, the processor 200 determines a first physical cell identity for at least one wireless telecommunication device HBS which is located in the area the access gateway AGW is in charge of. In a variant, the first physical cell identity is determined by a core network device of the wireless cellular telecommunication network or by each wireless telecommunication device HBS.

The first physical cell identity allocated to a wireless telecommunication device HBS is not shared with each wireless telecommunication device located in the direct neighbourhood of the wireless telecommunication device, however it can be shared by wireless communication devices that are neighbours of a neighbouring wireless communication device or base station.

The first physical cell identifier is intended to identify the cell of the wireless telecommunication device among neighbouring cells of other wireless telecommunication devices and to characterise a code for scrambling data exchanged between the wireless telecommunication device and mobile terminals.

At next step S701, the processor 200 determines a second physical cell identity for at least one wireless telecommunication device HBS which is located in the area the access gateway AGW is in charge of. In a variant, the or each second physical cell identity is determined by a core network device of the wireless cellular telecommunication network or by each wireless telecommunication device HBS.

The second physical identity is allocated to a wireless telecommunication device for the purpose of providing additional information for identifying a wireless telecommunication device.

At next step S702, the processor 200 determines a power pattern for the first physical cell identity determined at step S700. The power pattern is intended to be applied by the corresponding wireless telecommunication device HBS for transferring the first physical cell identity to mobile terminals.

For example, the power pattern is determined as the ICIC parameters determined at step S501 of FIG. 5 or is equal to a predetermined value.

At next step S703, the processor 200 determines a power pattern for each second physical cell identity determined at step S701 or S706 as it will be disclosed herein after. Each power pattern is intended to be applied by the corresponding wireless telecommunication device HBS for transferring the second physical cell identity to mobile terminals.

According to the invention, the power pattern for transferring the or each second physical cell identity to mobile terminals is strictly lower than the power pattern for transferring the first physical cell identity to mobile terminals by the wireless telecommunication device.

At next step S704, the processor 200 commands the transfer of a message comprising the first physical cell identity and the at least one second physical cell identity together with the power patterns to each of the at least one wireless telecommunication device.

When the present algorithm is executed by a base station BS, the processor 300 commands the wireless interface 405 in order to transfer the first and the at least second identifiers in parallel and at the corresponding power patterns.

At step S705, the processor 200 checks if from measurement reports received by mobile terminals or base stations, or by message received from other devices of the wireless cellular telecommunication network, the wireless telecommunication device can be uniquely identified among neighbouring wireless telecommunication devices, i.e. if one wireless telecommunication device has not two neighbour wireless telecommunication devices sharing the same first and second physical cell identifiers.

If the wireless telecommunication device can be uniquely identified among neighbouring wireless telecommunication devices, the processor 200 interrupts the present algorithm. Otherwise, the processor 200 moves to step S706.

At step S706, the processor 200 determines a supplementary second physical cell identity for at least one wireless telecommunication device HBS which is located in the area the access gateway AGW is in charge of. In a variant, the supplementary second physical cell identity is determined by a core network device of the wireless cellular telecommunication network or by each wireless telecommunication device HBS.

The supplementary second physical identity is allocated to a wireless telecommunication device for the purpose of providing additional information for identifying the wireless telecommunication device.

After that, the processor 200 returns to step S703 already disclosed.

FIG. 8 discloses an example of an algorithm executed by a wireless telecommunication device according to the present invention.

More precisely, the present algorithm is executed by the processor 400 of the wireless telecommunication device HBS.

At step S800, the processor 400 obtains a first physical cell identity. The first physical cell identity is received from the access gateway AGW or from a base station BS and is as the one disclosed at step S503 of FIG. 5 or as the one disclosed at step S600 of FIG. 6 or as the one disclosed at step S700 of FIG. 7 or is determined by the wireless telecommunication device HBS as disclosed at step S600 of FIG. 6.

At next step S801, the processor 400 obtains the power pattern to be applied for transferring the first physical cell identity to mobile terminals. The power pattern is received from the access gateway AGW or from a base station BS and is as the one disclosed at step S504 of FIG. 5 or as the one disclosed at step S602 of FIG. 6 or as the one disclosed at step S702 of FIG. 7 or is determined by the wireless telecommunication device HBS as disclosed at step S602 of FIG. 6.

At next step S802, the processor 400 obtains a second physical cell identity. The second physical cell identity is received from the access gateway AGW or from a base station BS and is as the one disclosed at step S501 of FIG. 5 or as the one disclosed at step S601 of FIG. 6 or as the one disclosed at step S701 or S706 of FIG. 7 or is determined by the wireless telecommunication device HBS as disclosed at step S601 of FIG. 6.

At next step S803, the processor 400 obtains the power pattern to be applied for transferring the second physical cell identity to mobile terminals. The power pattern is received from the access gateway AGW or from a base station BS and is as the one disclosed at step S505 of FIG. 5 or as the one disclosed at step S603 of FIG. 6 or as the one disclosed at step S703 of FIG. 7 or is determined by the wireless telecommunication device as disclosed at step S603 of FIG. 6.

At next step S804, the processor 400 commands the wireless interface 405 in order to transfer the first and second identifiers in parallel and at the corresponding power patterns.

After that, the processor 400 interrupts the present algorithm.

Naturally, many modifications can be made to the embodiments of the invention described above without departing from the scope of the present invention.

The invention claimed is:

1. A method for controlling signals transferred by a wireless telecommunication device of a wireless cellular telecommunication network to mobile terminals, wherein a first and at least one second physical cell identifiers are allocated to the wireless telecommunication device, the first physical cell identifier including information that identifies the cell of the wireless telecommunication device relative to neighboring cells of other wireless telecommunication devices and that further identifies a code for scrambling data exchanged between the wireless telecommunication device and the mobile terminals, the at least one second physical cell identifier providing cell identification without information identifying a code for scrambling data exchanged with the mobile terminals, the method comprises the steps of:
  determining a first power pattern to be applied by the wireless telecommunication device for transferring signals representative of the first physical cell identifier to the mobile terminals;
  determining another power pattern to be applied by the wireless telecommunication device for transferring signals representative of the at least one second physical cell identifier to the mobile terminals, the another power pattern being strictly lower than the first power pattern;
  transferring the first and the at least one second physical cell identifiers and the power patterns to the wireless telecommunication device and/or transferring in parallel signals representative of the first and the at least one second physical cell identifiers according to the power patterns to the mobile terminals.

2. The method according to claim 1, wherein the method is executed by a base station or an access gateway of the wireless cellular telecommunication network and in that one second physical cell identifier identifies each wireless telecommunication device of a group of wireless telecommunication devices, at least two wireless telecommunication devices being neighbors.

3. The method according to claim 2, wherein the another power pattern to be applied by the wireless telecommunication device for transferring signals representative of the second physical cell identifier to the mobile terminals is lower than the first power pattern to be applied by the wireless telecommunication device for transferring signals representative of the first physical cell identifier to the mobile terminals divided by the number of telecommunication devices included in the group of telecommunication devices located in a neighborhood of the wireless communication device.

4. The method according to claim 1, wherein the method is executed by a base station or an access gateway of the wireless cellular telecommunication network or the wireless telecommunication device and in that the at least one second physical cell identifier increases the probability of unique identification of the cell of the wireless telecommunication device which transfers the first physical cell identifier.

5. The method according to claim 4, wherein a second physical cell identifier is added to signals transmitted in a cell by a wireless communication device when it is detected that the cell can't be differentiated in a neighborhood from at least one other cell of a wireless telecommunication device from their physical cell identifiers.

6. The method according to claim 5, wherein the power patterns of at least two second physical cell identifiers are set with decreasing values, the sum of transmitted powers of second physical cell identifiers being lower than the transmitted power of the first physical cell identifier.

7. The method according to claim 1, wherein the wireless telecommunication device is a home base station or a relay.

8. A device for controlling signals transferred by a wireless telecommunication device of a wireless cellular telecommunication network to mobile terminals, wherein a first and at least one second physical cell identifiers are allocated to the wireless telecommunication device, the first physical cell identifier including information that identifies the cell of the wireless telecommunication device relative to neighboring cells of other wireless telecommunication devices and that further identifies a code for scrambling data exchanged between the wireless telecommunication device and the mobile terminals, the at least one second physical cell identifier providing cell identification without information identifying a code for scrambling data exchanged with mobile terminals, the device for controlling signals comprising:

means for determining a first power pattern to be applied by the wireless telecommunication device for transferring signals representative of the first physical cell identifier to the mobile terminals;

means for determining another power pattern to be applied by the wireless telecommunication device for transferring signals representative of the at least one second physical cell identifier to the mobile terminals, the another power pattern being strictly lower than the first power pattern;

means for transferring the first and the at least one second physical cell identifiers and the power patterns to the wireless telecommunication device and/or transferring in parallel signals representative of the first and the at least one second physical cell identifiers according to the power patterns to the mobile terminals.

9. A non-transitory medium carrying a programmable device readable program comprising instructions or portions of code for implementing the steps of the method according to any one of claims 1 to 7, when said programmable device readable program is read and executed by a programmable device.

\* \* \* \* \*